US009420778B1

(12) United States Patent
Tiberius et al.

(10) Patent No.: US 9,420,778 B1
(45) Date of Patent: Aug. 23, 2016

(54) NOISE-MAKING APPARATUS AND METHOD

(71) Applicant: Tiberius Technology, LLC, Fort Wayne, IN (US)

(72) Inventors: Dennis E. Tiberius, Fort Wayne, IN (US); Richard B. Mason, Fort Wayne, IN (US); Jonathan S. Willson, Cecil, OH (US); Benjamin T. Tiberius, Fort Wayne, IN (US)

( * ) Notice: Subject to any disclaimer, the term of this patent is extended or adjusted under 35 U.S.C. 154(b) by 144 days.

(21) Appl. No.: 14/502,961

(22) Filed: Sep. 30, 2014

Related U.S. Application Data (60) Provisional application No. 61/884,866, filed on Sep. 30, 2013.

(51) Int. Cl.
| | |
|---|---|
| *A01M 29/16* | (2011.01) |
| *G01K 5/00* | (2006.01) |
| *G10K 5/00* | (2006.01) |
| *G10K 1/068* | (2006.01) |

(52) U.S. Cl.
CPC .............. *A01M 29/16* (2013.01); *G10K 1/068* (2013.01); *G10K 5/00* (2013.01)

(58) Field of Classification Search
CPC ..... A01M 29/16; A01M 29/18; A01M 29/20; B63C 11/26; G10K 1/068; G10K 5/00; G10K 5/02; G10K 9/04; G10K 9/06
USPC .......................... 116/22 A, 24, 137 R, 142 FP
See application file for complete search history.

(56) References Cited

U.S. PATENT DOCUMENTS

| | | | |
|---|---|---|---|
| 1,634,927 A | * | 7/1927 | Woodring .............. G10K 1/068 91/49 |
| 2,357,951 A | | 9/1944 | Hale |
| 2,526,018 A | | 10/1950 | Foster et al. |
| 2,581,758 A | | 1/1952 | Galliano et al. |
| 2,780,213 A | | 2/1957 | Colling et al. |
| 2,885,811 A | | 5/1959 | Womble, Jr. |
| 3,143,819 A | | 8/1964 | Stevens, Jr. |
| 3,205,604 A | | 9/1965 | Plumer |
| 3,453,762 A | | 7/1969 | Fremont |
| 3,572,310 A | | 3/1971 | Chiba |
| 3,732,643 A | | 5/1973 | Wells |

(Continued)

FOREIGN PATENT DOCUMENTS

| | | | | | |
|---|---|---|---|---|---|
| FR | 466073 A | * | 5/1914 | ............ | A01M 29/20 |
| GB | 2449314 A | * | 11/2008 | ............ | A62B 9/006 |
| KR | 20120115669 A | * | 10/2012 | ............ | A01M 29/16 |

*Primary Examiner* — R. A. Smith (74) *Attorney, Agent, or Firm* — Warren M. Pate; Pate Peterson, PLLC (57) ABSTRACT

A pneumatic engine for metering or controlling of flow of compressed gas. is disclosed. In certain embodiments, the flow may be used to sound a whistle. The engine may include a body comprising a first chamber having an exit aperture, a second chamber having an entrance aperture, and a bolt aperture connecting the first chamber to the second chamber. A bolt may be positioned within the bolt aperture and extending into the first chamber and into the second chamber. The bolt may comprise a conduit extending therewithin. The conduit may place the first chamber in fluid communication with the second chamber. The bolt may selectively travel within the body through a range of motion. The range of motion may comprise a first position wherein the bolt blocks the exit aperture and a second position wherein the bolt does not block the exit aperture.

20 Claims, 12 Drawing Sheets

(56) References Cited

U.S. PATENT DOCUMENTS

| | | | |
|---|---|---|---|
| 3,854,376 | A | 12/1974 | Elmore et al. |
| 3,888,159 | A | 6/1975 | Elmore et al. |
| 3,964,199 | A | 6/1976 | Musgrave |
| 4,004,566 | A | 1/1977 | Fischer |
| 4,137,893 | A | 2/1979 | Beauchamp |
| 4,329,802 | A | 5/1982 | Coonan |
| 4,514,922 | A | 5/1985 | Farrar et al. |
| 4,563,937 | A | 1/1986 | White |
| 4,850,330 | A | 7/1989 | Nagayoshi |
| 4,872,279 | A | 10/1989 | Boat |
| 4,951,644 | A | 8/1990 | Bon |
| 4,970,818 | A | 11/1990 | Vecchieschi |
| 4,995,179 | A | 2/1991 | Switzer |
| 4,998,499 | A * | 3/1991 | Nordbeck ............... G10K 9/04 116/137 R |
| 5,081,778 | A | 1/1992 | Switzer |
| 5,113,604 | A | 5/1992 | Vyprachticky |
| 5,113,605 | A | 5/1992 | Kim |
| 5,280,778 | A | 1/1994 | Kotsiopoulos |
| 5,291,679 | A | 3/1994 | Wollack et al. |
| 5,302,055 | A * | 4/1994 | Johnston ............... B06B 1/183 116/112 |
| 5,309,660 | A | 5/1994 | Blackamore |
| 5,450,683 | A | 9/1995 | Miller |
| 5,450,839 | A | 9/1995 | Nicolaevich et al. |
| 5,477,843 | A | 12/1995 | Kunimoto |
| 5,505,188 | A | 4/1996 | Williams |
| 5,542,406 | A | 8/1996 | Oneto |
| 5,561,258 | A | 10/1996 | Bentley et al. |
| 5,561,933 | A | 10/1996 | Czekalski |
| 5,568,696 | A | 10/1996 | Mauch et al. |
| 5,664,552 | A | 9/1997 | Kunimoto |
| 5,669,369 | A | 9/1997 | Scott |
| 5,697,179 | A | 12/1997 | Vanmoor |
| 5,700,972 | A | 12/1997 | Saxby |
| 5,704,342 | A | 1/1998 | Gibson et al. |
| 5,711,286 | A | 1/1998 | Petrosyan et al. |
| 5,771,875 | A | 6/1998 | Sullivan |
| 5,839,422 | A | 11/1998 | Ferris |
| 5,842,300 | A | 12/1998 | Cheshelski et al. |
| 5,845,426 | A | 12/1998 | Valorose |
| 5,913,303 | A | 6/1999 | Kotsiopoulos |
| 6,073,620 | A | 6/2000 | Kunimoto |
| 6,112,734 | A | 9/2000 | Kunimoto |
| 6,158,424 | A | 12/2000 | Kunimoto |
| 6,160,760 | A * | 12/2000 | Rayner ............... B63C 11/26 116/137 R |
| 6,257,115 | B1 | 7/2001 | Balsavage et al. |
| 6,470,872 | B1 | 10/2002 | Tiberius et al. |
| 6,497,229 | B1 | 12/2002 | Maeda |
| 6,701,909 | B2 | 3/2004 | Tiberius et al. |
| 8,925,478 | B2 * | 1/2015 | Graber ............... G10K 11/26 116/137 R |

\* cited by examiner

NOISE-MAKING APPARATUS AND METHOD

RELATED APPLICATIONS

This application claims the benefit of U.S. Provisional Patent Application Ser. No. 61/884,866 filed Sep. 30, 2013, which is hereby incorporated by reference.

BACKGROUND

1. The Field of the Invention

This invention relates to noise-making and, more particularly, to novel systems and methods for delivering compressed gas to a whistle.

2. The Background Art

Sound may be a useful tool. For example, sound (e.g., loud noise) may be useful in clearing birds from an airfield. In the past, noise for such purposes has often been generated by firing ammunition (e.g., blank ammunition) in a firearm. However, such a method for generating noise is relatively expensive and associated with certain safety risks. Accordingly, what is needed is a noise-making device that is relatively inexpensive to manufacture, inexpensive to operate, and safe.

BRIEF SUMMARY OF THE INVENTION

In view of the foregoing, in accordance with the invention as embodied and broadly described herein, a method and apparatus for producing noise are disclosed in one embodiment of the present invention as including in a frame, trigger assembly, pneumatic engine, whistle, and a source of compressed gas. In selected embodiments, a frame may include or form a housing extending to cover or protect one or more components of a noise-making device. A trigger assembly may provide a mechanism through which a user may control the flow of gas from a source, through an engine, and into a whistle. For example, by manipulating a trigger of a trigger assembly, a user may release a bolt of an engine to cycle.

A trigger assembly may provide or support one or more engine cycles (and, consequently, one or more noise bursts) per pull of a trigger. Thus, a trigger assembly may provide or support "semi-automatic" operation, a multi-cycle burst, or "fully-automatic" operation. In selected embodiments, a trigger assembly may provide or support "select fire" wherein a user may select and switch between semi-automatic operation, short multi-cycle bursts, and fully-automatic operation.

An engine may control, regulate, and/or meter the compressed gas delivered to a whistle. For example, with each cycle thereof, an engine may deliver a specific quantity or packet of compressed gas to a whistle. In selected embodiments, an engine may be configured to deliver each such packet of compressed air rapidly in a quick burst, enabling the whistle to generate a significant amount of sound or noise therefrom.

In selected embodiments, an engine may include a body, bolt, one or more seals, or the like or one or more combinations or sub-combinations thereof. A body may include or form one or more chambers, apertures, conduits, or the like. For example, a body may include a forward chamber, rearward chamber, and bolt aperture extending to connect the forward chamber to the rearward chamber.

The volume of a forward chamber may control or define the volume of compressed gas to be delivered to a whistle in a given cycle. An exit aperture may form an exit through which compressed gas leaves a forward chamber. In a "ready-to-fire" or closed configuration, a bolt may extend from within a bolt aperture, through a forward chamber, and into an exit aperture. This may block the exit aperture and prevent compressed gas contained within the forward chamber from exiting. A trigger assembly may block a bolt from moving (e.g., translating) out of the exit aperture. Thus, in a ready-to-fire configuration, compressed gas may be maintained within a forward chamber.

Due to a change (e.g., step down) in the diameter of a bolt within a forward chamber, compressed gas within the forward chamber may forcefully bias the bolt toward the rear of an engine. Accordingly, when a trigger is actuated and the trigger assembly releases the bolt, the bolt may quickly move rearward as biased. Such rearward motion may remove the bolt from the exit aperture. Accordingly, compressed gas may exit a forward chamber through the exit aperture.

Once a forward chamber has vented through an exit aperture, the biasing force urging a bolt rearward may be relieved. Accordingly, the bolt may move forward and once again block an exit aperture. In selected embodiments, a force for urging a bolt forward may be generated by a piston portion of the bolt.

For example, a piston portion may be configured to move with the rest of a bolt. Accordingly, as a bolt moves rapidly rearward, a piston portion may move rapidly rearward into a rearward chamber. This rapid rearward motion of a piston portion may compress gas within a rearward chamber. This compression may slow and eventually stop rearward motion of a bolt. Additionally, once a forward chamber has vented, this compression may be sufficient to bias a bolt forward back into a ready-to-fire configuration, thereby completing a cycle of the engine.

To recharge for another cycle, compressed gas may be introduced into a rearward chamber, then conducted forward to a forward chamber. For example, a bolt may have a conduit extending therethrough. Accordingly, a forward chamber may be charged by compressed gas flowing through a conduit in a bolt. The size (e.g., cross-section) of the conduit may be sufficiently large to allow relatively rapid charging of a forward chamber, yet sufficiently small to preserve the compressive effect caused by a rearward moving piston portion.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 1:
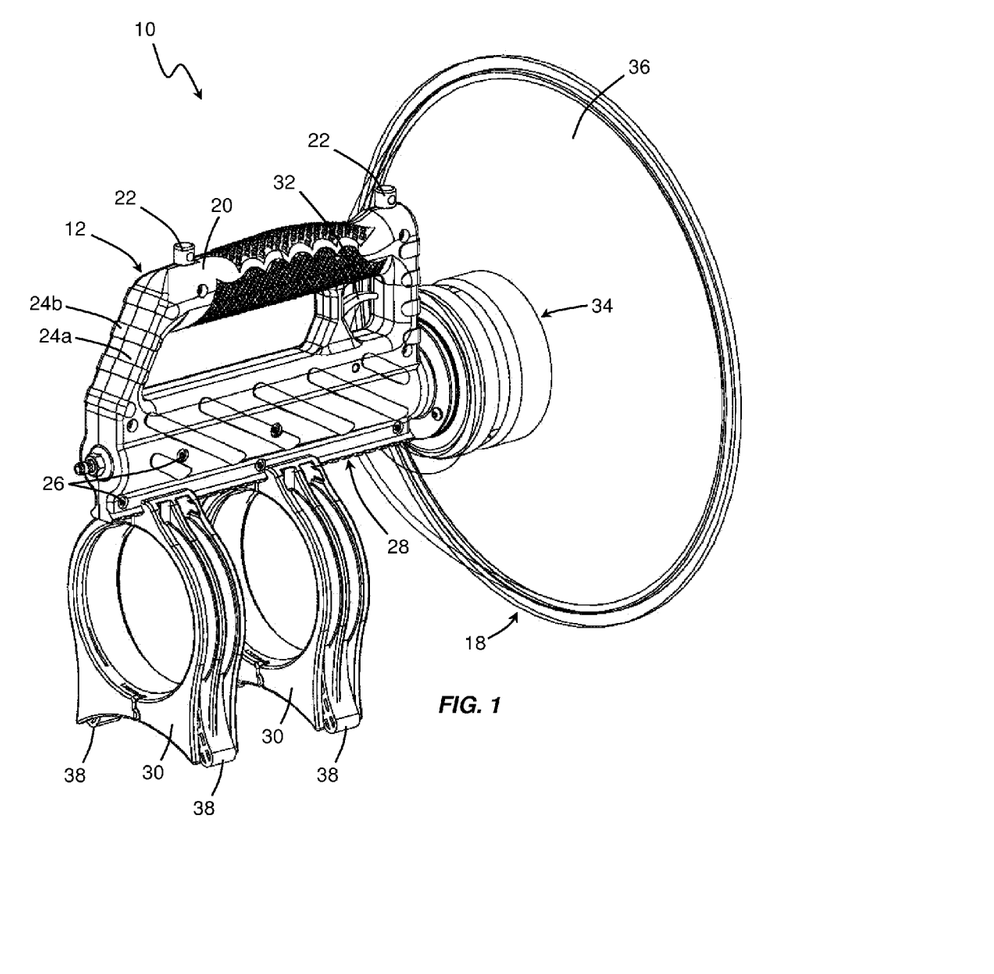
FIG. 1 is a perspective view of one embodiment of a noise-making device in accordance with the present invention.
Figure 2:
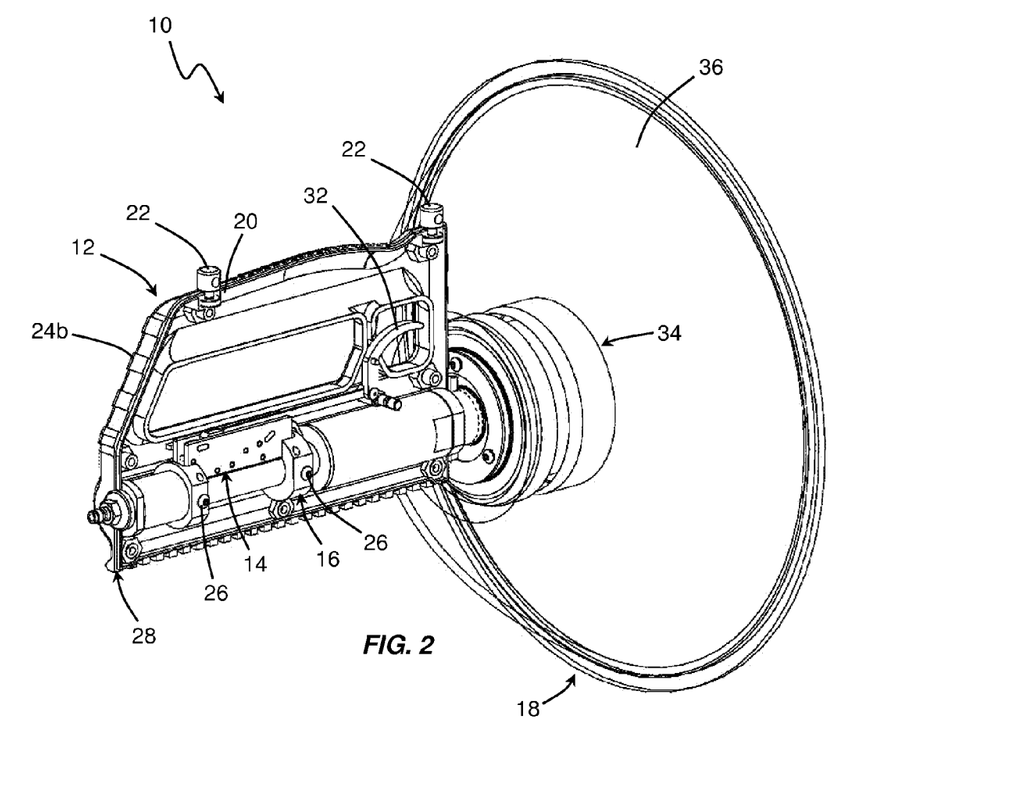
FIG. 2 is a perspective view of the noise-making device of FIG. 1 with the tank mounts, one half of the housing, and various fasteners removed to expose the exterior of a pneumatic engine and trigger assembly.
Figure 3:
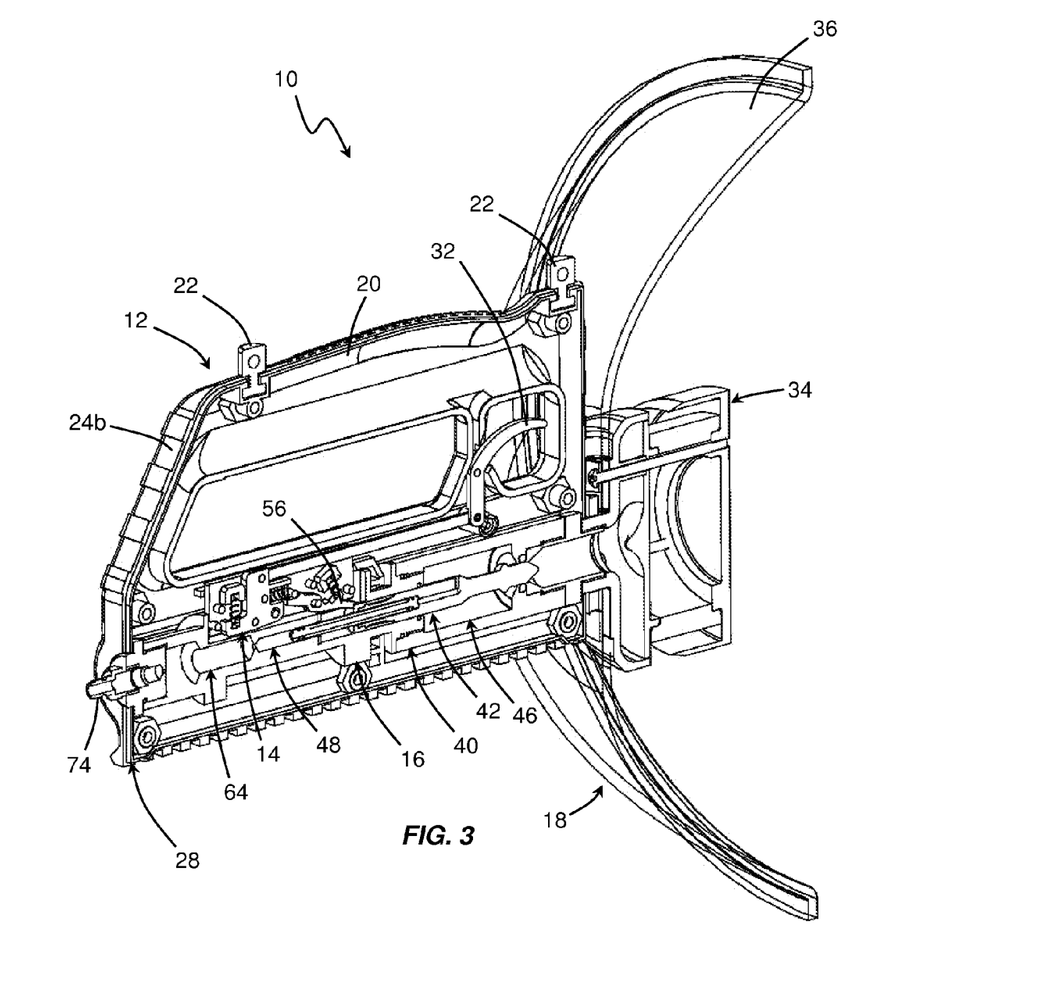
FIG. 3 is a perspective, cross sectional view of the noise-making device of FIG. 1 with the tank mounts removed.
Figure 4:
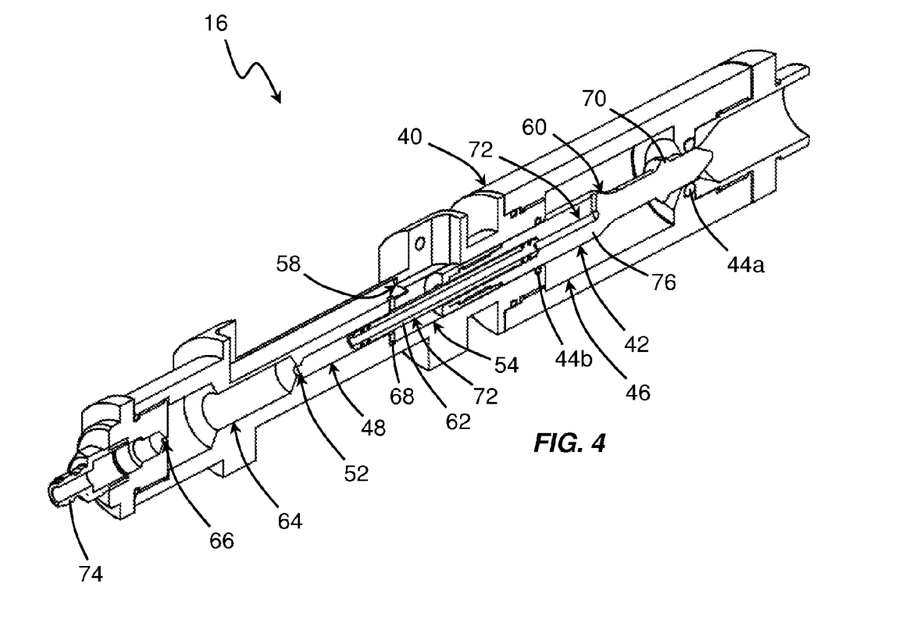
FIG. 4 is a perspective, cross sectional view of the pneumatic engine of FIG. 2.
Figure 5:
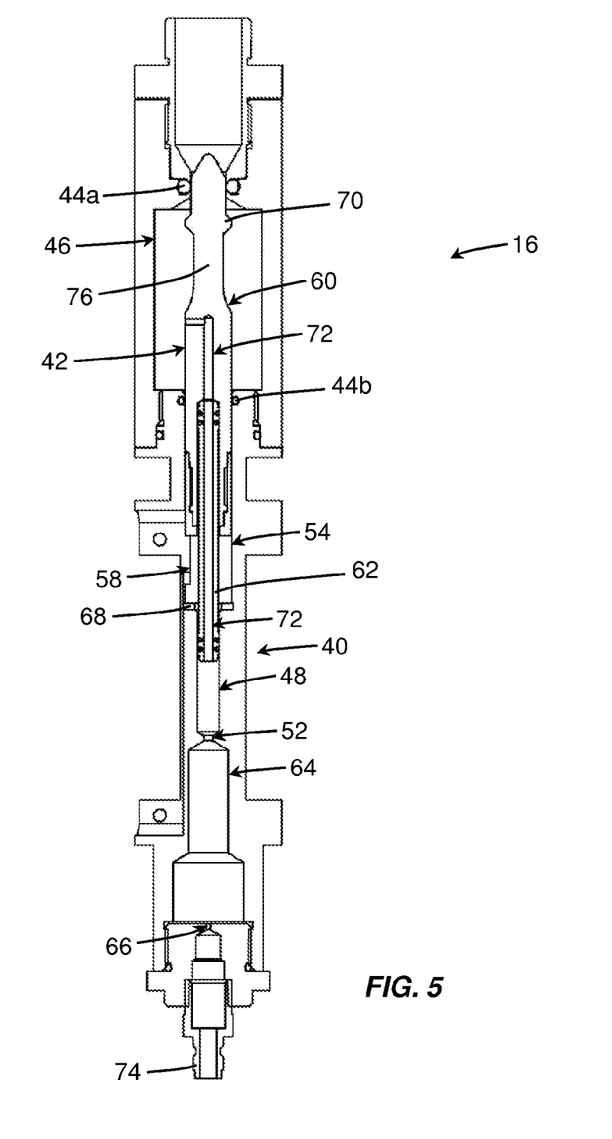
FIG. 5 is a side, cross sectional view of the pneumatic engine of FIG. 2 with the bolt in a forward position.
Figure 6:
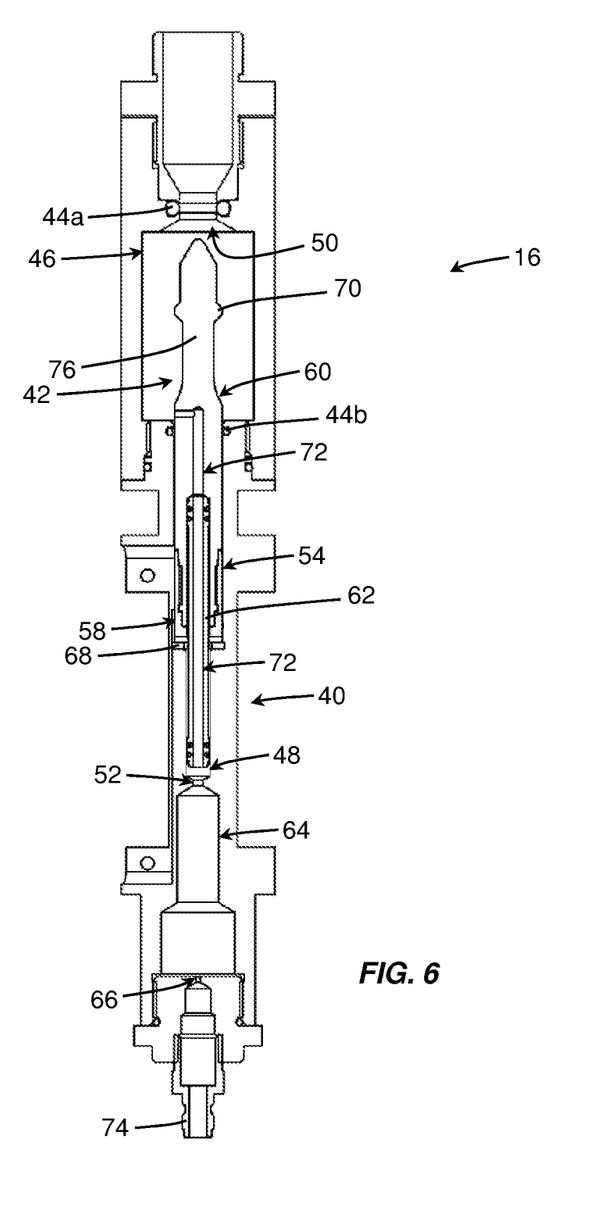
FIG. 6 is a side, cross sectional view of the pneumatic engine of FIG. 2 with the bolt in a rearward position.

Referring to FIGS. 1-2, in selected embodiments, a noise-making device 10 in accordance with the present invention may include a frame 12, trigger assembly 14, pneumatic engine 16, whistle 18, source of compressed gas (not shown), or a combination or sub-combination thereof. A frame 12 may provide a structure to which one or more other components of a device 10 may secure. In certain embodiments, a frame 12 may include or form a handle 20, one or more connection points 22 (e.g., sling swivels 22 to which a sling may secure), or the like or combinations thereof to enable a user to carry, grasp, and/or aim a device 10. Alternatively, or in addition thereto, a frame 12 may include or form a housing extending to cover or protect one or more components of a device 10.

For example, a frame 12 may comprise two halves 24a, 24b secured together by one or more fasteners 26. Various components of a device 10 may be secured between the two halves 24a, 24b. For example, in the illustrated embodiment, the pneumatic engine 16 and certain portions of a trigger assembly 14 may be enclosed within the two halves 24a, 24b.

In selected embodiments, a frame 12 may include one or more rails 28 (e.g., one or more Picatinny rails, Weaver rail mounts, or the like). A rail 28 may provide a location for securing one or more accessories or attachments to the frame 12. For example, in selected embodiments, a device 10 may include one or more tank mounts 30 secured to a rail 28. The tank mounts 30 may provide a mechanism for clamping and securing one or more tanks containing compressed gas. Any such tank may be a source of compressed gas for the corresponding device 10.

A trigger assembly 14 may provide a mechanism through which a user may control the flow of gas from a source, through an engine 16, and into a whistle 18. For example, by manipulating a trigger 32 of a trigger assembly 14, a user may open and/or close (or control) an engine 16. In selected embodiments, a trigger assembly 14 may provide or support one cycle of the engine 16 (and, consequently, one noise burst) per pull of a trigger 32. In other embodiments, a trigger assembly 14 may provide or support a series of cycles (and, consequently, a series of noise bursts) for as long as a trigger 32 is pulled and a source of compressed gas holds out or for a predetermined number of cycles. Thus, a trigger assembly 14 may provide or support "semi-automatic" operation, "fully-automatic" operation, or something in between (e.g., a multi-cycle burst). In still other embodiments, a trigger assembly 14 may provide or support "select fire" wherein a user may select and switch between semi-automatic operation, fully-automatic operation, multi-cycle burst, or the like or a combination or sub-combination thereof.

An engine 16 may control, regulate, and/or meter the compressed gas delivered to a whistle 18. For example, with each cycle thereof, an engine 16 may deliver a specific quantity or packet of compressed gas to a whistle 18. In selected embodiments, an engine 16 may be configured to deliver each such quantity or packet of compressed gas rapidly (e.g., in a quick burst, rather than a slower bleed), enabling the whistle 18 to generate a significant amount of sound or noise therefrom. Thus, an engine 16 may ensure an efficient use of compressed gas (e.g., a high ratio of sound or noise to consumed compressed gas).

A whistle 18 may produce sound from the forced gas delivered thereto. In selected embodiments, a whistle 18 may be tuned to make the most or best (e.g., most usefully pitched) sound from the quantities or packets of compressed gas delivered thereto by an engine 16. In certain embodiments, a whistle 18 may include a sound generator 34 and a director 36. A sound generator 34 may be responsible for producing sound, while a director 36 (e.g., a semi-parabolic reflector) may be responsible for directing or aiming that sound in a particular direction. This may ensure that more sound reaches an intended target and less sound reaches or bothers a user. In the illustrated embodiment, the director 36 is shown as being made of a clear material (e.g., a transparent or semi-transparent polymeric material).

In certain embodiments, a device 10 may include one or more feet 38. Feet 38 may support the device 10 in a particular position on a supporting surface. For example, feet 38 may support the device 10 in a "handle-up" positioned to make the handle 20 readily accessible. In certain embodiments, feet 38 may be formed into the extremes of one or more tank mounts 30. Feet 38 so positioned may extend clear of a director 36 to support a device 10 in a handle-up position despite the relatively large diameter of the director 36.

A source of compressed gas may have any suitable form or composition. For example, a source of compressed gas may comprise a tank of compressed gas, a compressor, or the like or some combination thereof. The compressed gas contained or provided by a source may likewise have any suitable form or composition. For example, in selected embodiments, the compressed gas may comprise compressed air, compressed carbon dioxide, or the like.

A source of compressed gas may be portable. That is, a source may be sized and shaped to enable a user of the device 10 to carry the source. For example, a source (e.g., tank) may secured directly (e.g, directly and rigidly) to a frame 12 via one or more tank mounts 30. Alternatively, one or more sources (e.g., tanks, compressors, or combinations thereof) may be carried by a user in or on a backpack or the like.

Referring to FIGS. 3-6, in selected embodiments, an engine 16 may include a body 40, a bolt 42, one or more seals 44, or the like or one or more combinations or sub-combinations thereof. A body 40 may include or form one or more chambers, apertures, conduits, or the like. For example, a body 40 may include a first, forward chamber 46, second, rearward chamber 48, exit aperture 50, entrance aperture 52, and bolt aperture 54.

The volume of a forward chamber 46 may control or define the volume of compressed gas to be delivered in a given cycle to a whistle 18. An exit aperture 50 may form an exit through which compressed gas leaves a forward chamber 46. In a "ready-to-fire" or closed configuration, a bolt 42 may extend from within a bolt aperture 54, through a forward chamber 46, and into an exit aperture 50. A first seal 44a may seal an interface between a bolt 42 and an exit aperture 50. A second seal 44b may seal an interface between a bolt 42 and a bolt aperture 54. A trigger assembly 14 may block a bolt 42 from moving (e.g., translating) out of engagement with the first seal 44a. For example, a sear 56 of a trigger assembly 14 may extend through an aperture 58 in a body 40 to engage a bolt 42 and block it from moving rearward. Thus, in a ready-to-fire configuration, compressed gas may be maintained within a forward chamber 46.

Due to a change 60 (e.g., step down 60) in the diameter of a bolt 42 within a forward chamber 46, compressed gas within the forward chamber 46 may forcefully bias the bolt 42 toward the rear of an engine 16. Accordingly, when a trigger 32 is actuated and the trigger assembly 14 releases the bolt 42, the bolt 42 may quickly move rearward as biased. Such rearward motion may unblock the exit aperture 50 (e.g., remove the bolt 42 from the exit aperture 50). Accordingly, compressed gas may exit a forward chamber 46 through the exit aperture 50. In selected embodiments, an exit aperture 50 may be relatively large. Thus, the compressed gas may exit a forward chamber 46 rapidly. This compressed gas may be conducted into an inlet of a whistle 18.

Once a forward chamber 46 has vented through an exit aperture 50, the biasing force urging a bolt 42 rearward may be relieved. Accordingly, the bolt 42 may move forward and once again block an exit aperture 50. In selected embodiments, a force for urging a bolt 42 forward may be generated by a piston 62 forming part of the bolt 42.

For example, a piston 62 may be configured to move with the rest of a bolt 42. A piston 62 may extend from within a bolt aperture 54 into a rearward chamber 48. Accordingly, as a bolt 42 moves rapidly rearward, a piston 62 may move rapidly rearward into a rearward chamber 48. This rapid rearward motion of a piston 62 may compress gas within a rearward chamber 48, one or more chambers 64 connected to the rearward chamber 48 (e.g., a third chamber 64 connected to the rearward chamber 48 via a small aperture 66), or a combination thereof. This compression may slow and eventually stop rearward motion of a bolt 42. (To further smooth the operation of an engine 16, an elastomeric or cushioning bumper 68 for a bolt 42 may be included as desired or necessary. Such a bumper 68 may define one end to a range of motion of a bolt 42 and cushion any impact should the bolt 42 reach that end of the range of motion.) Additionally, once a forward chamber 46 has vented, compressed gas (e.g., compressed gas produced by the rearward motion of a piston 62, provided by a source, or some combination thereof) within a rearward chamber 48 may be sufficient to bias a bolt 42 forward back into a ready-to-fire configuration, thereby completing a cycle of the engine 16.

In semi-automatic operation, once a bolt 42 returns sufficiently forward, it may be engaged and maintained in that forward position by a trigger assembly 14. The forward chamber 46 may then be recharged and a second pull of a trigger 32 may be needed to initiate another cycle of the engine 16. Conversely, in some form of automatic operation, a trigger assembly 14 may not engage a bolt 42. Accordingly, once a forward chamber 46 is sufficiently charged, the resulting pressure differential may again drive the bolt 42 rearward, initiating another cycle thereof.

In selected embodiments, a bolt 42 may close an exit aperture 50 before the bolt 42 has completed its forward motion. Thus, there may be a period of time between the sealing of an exit aperture 50 and the stopping of the forward motion of the bolt 42 (e.g., the bolt 42 or a shoulder 70 thereof contacting or abutting a forward stop or bumper such as the material surrounding or defining the exit aperture 50). In certain embodiments, this period of time may be sufficient to substantially charge a forward chamber 46. Thus, by the time a bolt 42 completes its forward motion, the conditions may be set to initiate and drive the next cycle of the engine 16.

Compressed gas may be introduced into a forward chamber 46 in any suitable manner. In selected embodiments, compressed gas may be introduced into a rearward chamber 48, then conducted forward to a forward chamber 46. For example, one or more apertures and/or chambers may conduct compressed gas into a rearward chamber 48. From the rearward chamber 48, compressed gas may pass through a conduit 72 in the bolt 42 and into a forward chamber 46. The sizes or cross-sections of the various apertures (e.g., entrance aperture 52, small aperture 66, or the like) and the conduit 72 may be sufficiently large to allow relatively rapid charging of a forward chamber 46, yet sufficiently small to preserve the compressive effect caused by a rearward moving bolt 42.

Compressed gas may be introduced into a rearward chamber 48 in any suitable manner. For example, in selected embodiments, a body 40 may include a connector 74 (e.g., a quick release nipple 74) that is in fluid communication with a rearward chamber 48. Thus, when a source of compressed gas engages the connector 75, compressed gas may be fed from the source into the rearward chamber 48. Compressed gas may then flow from the rearward chamber 48, through the various apertures that form the conduit 72 and into forward chamber 46.

Figure 7:
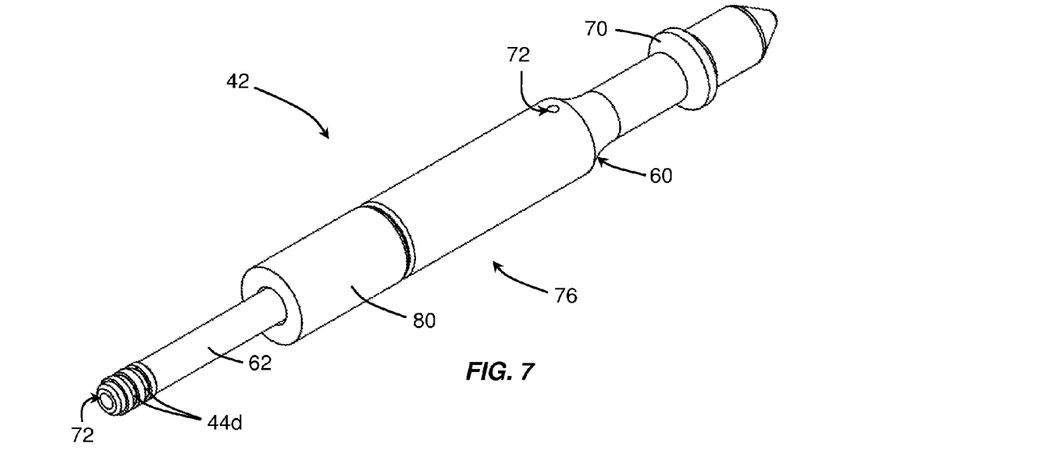
FIG. 7 is a perspective view of the bolt of FIG. 4.
Figure 8:
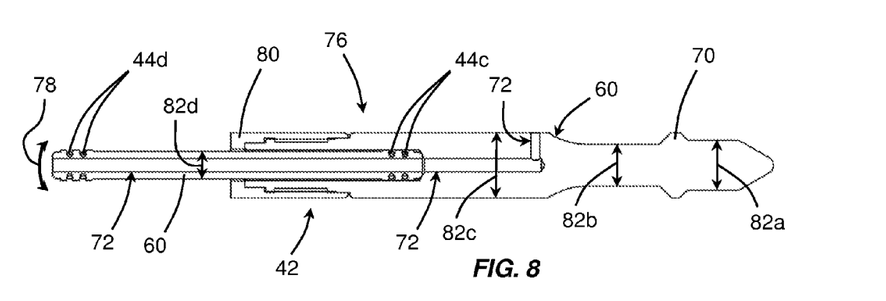
FIG. 8 is a side, cross-sectional view of the bolt of FIG. 4.

Referring to FIGS. 7 and 8, in selected embodiments, a bolt 42 may include multiple separable components or parts. For example, a bolt 42 may include a forward portion 76 and a piston 62. In certain embodiments, a piston 62 may be able to move with respect to a forward portion 76. For example, a piston 62 may extend into an aperture in a forward portion 76 to move therewith, yet the piston 62 (or certain intermediate portions of a piston 62) may be slightly narrower than the aperture in the forward portion 76. Accordingly, the piston 62 may be able to rock 78 or pivot 78 within the aperture and with respect to the forward portion 76. This ability to move slightly with respect to the forward portion 76 may limit or avoid any stress that may be associated with an imperfect alignment between a forward portion 76 and/or piston 62 and associated one or more apertures 50, 54. In certain embodiments, one or more seals 44c may seal an interface between a piston 62 and a forward portion 76, while one or more other seals 44d seal an interface between a piston 62 and a rearward chamber 48.

In selected embodiments, a forward portion 76 may include an end cap 80. An end cap 80 may perform various functions. For example, an end cap 80 may secure a piston 62 within an aperture of the forward portion 76. That is, an end cap 80 may be sized to engage a lip or shoulder (e.g., a lip or shoulder supporting or locating one or more seals 44c) of a piston 62. Accordingly, without an end cap 80 in place, a piston 62 to be inserted within an aperture in the forward portion 76. Thereafter, the end cap 80 may be applied (e.g., threaded onto the rest of the forward portion 76) to block the piston 62 from fully separating from the forward portion 76.

Alternatively, or in addition thereto, an end cap 80 may be formed of a material that facilitates and/or cushions motion of a bolt 42 within a body 40. For example, an end cap 80 may be formed of a material that has low wear, a low coefficient of friction, or the like at the interface with the material of the body that defines the bolt aperture 54. Alternatively, an end cap 80 may be formed of a material selected to cushion any impact should the bolt 42 reach a corresponding end of its range of motion with respect to a body 40.

A bolt 42 may have various diameters 82 along a length thereof. For example, a bolt 42 may have an exit diameter 82$a$ selected to match and/or block an exit aperture 50, a step down diameter 82$b$, a main diameter 82$c$ selected to match or fill a bolt aperture 54, a piston diameter 82$d$, or the like or a combination or sub-combination thereof. The relative sizing of such diameters 82 may define certain dynamics of a bolt 42. For example, by sizing an exit diameter 82$a$ and/or step down diameter 82$b$ less than a main diameter 82$c$, a step down 60 may be defined. This may ensure that pressurized gas within a forward chamber 46 may always bias a bolt 42 in a rearward direction.

Similarly, by selecting a piston diameter 82$d$ that is significantly smaller than a main diameter 82$c$, the nature of the compression produced by a piston 62 moving rearwardly within a rearward aperture 48 may be selected, balanced, and/or controlled. For example, it may be desirable to size the piston diameter 82$d$ so that the return force generated thereby (e.g., the building pressure that stops and reverses the rearward motion of a bolt 42 within a body 40) is sufficiently large to accomplish its intended purpose, but not so large as to prevent a bolt 42 from efficiently unblocking an exit aperture 50.

Figure 9:
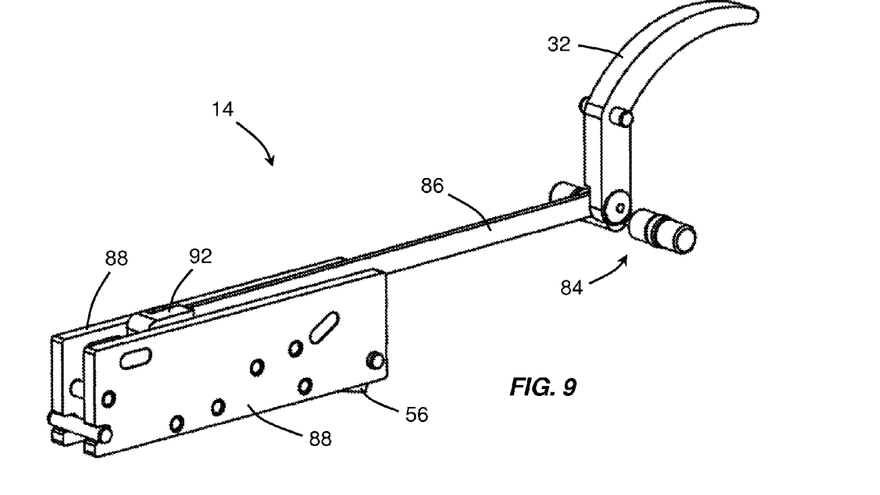
FIG. 9 is a perspective view of the trigger assembly of FIG. 2.
Figure 10:
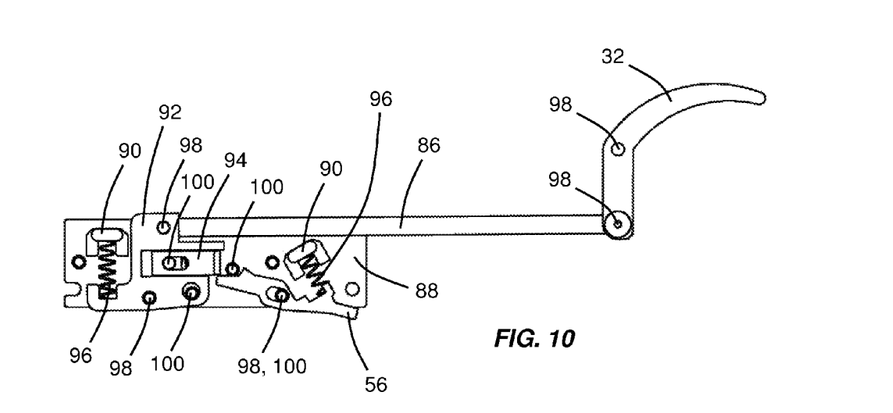
FIG. 10 is a side view of the trigger assembly of FIG. 9 without the safety and with a mounting plate removed to expose certain inner components of the trigger assembly.
Figure 11:
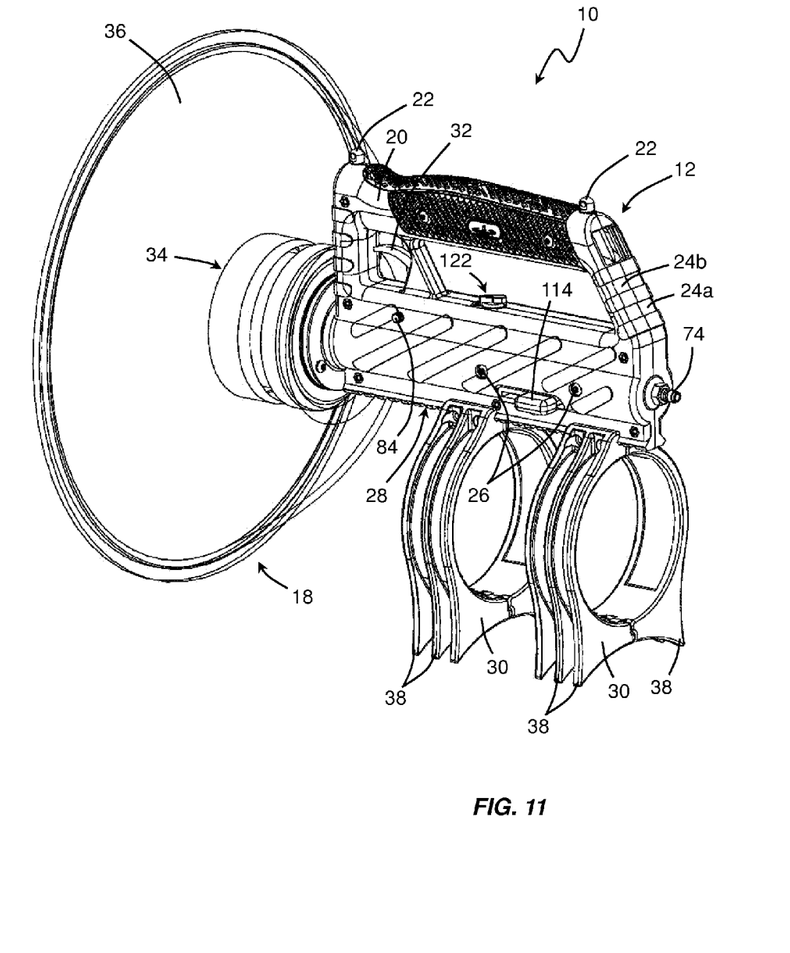
FIG. 11 is a perspective view of an alternative embodiment of a noise-making device in accordance with the present invention, the alternative embodiment including a charging mechanism, selector switch, and electric trigger.
Figure 12:
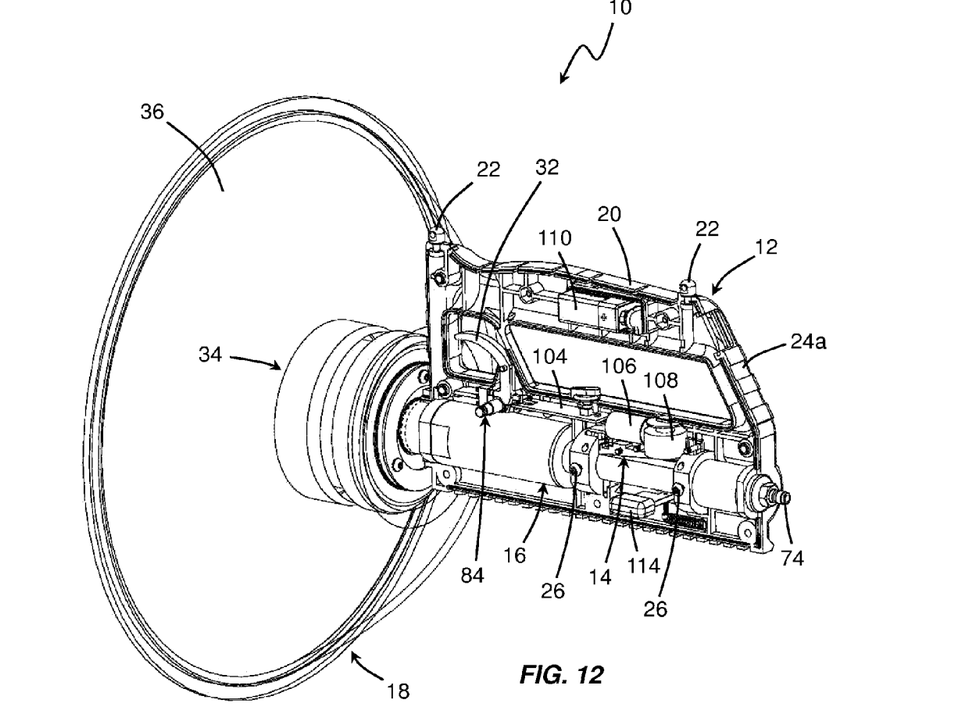
FIG. 12 is a perspective view of the noise-making device of FIG. 11 with the tank mounts, one half of the housing, and various fasteners removed to expose the exterior of a pneumatic engine and electric trigger assembly.
Figure 13:
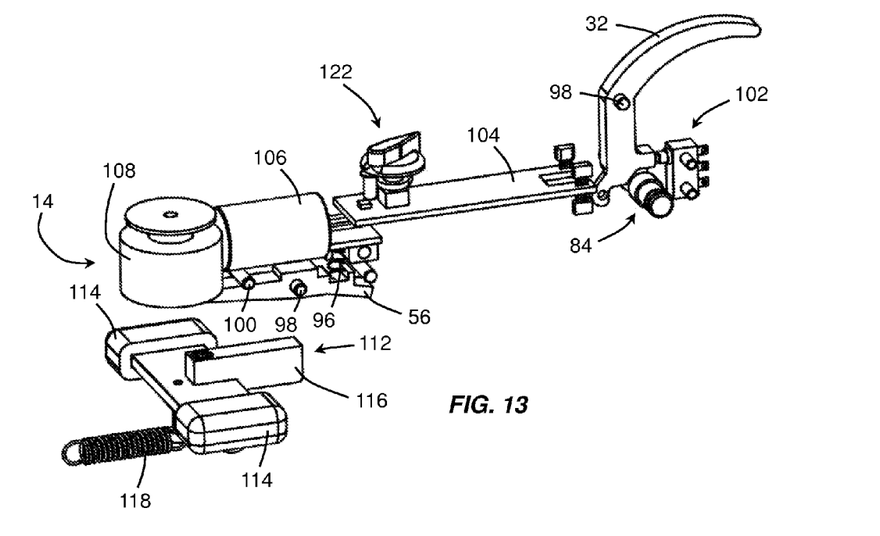
FIG. 13 is a perspective view of one embodiment of an electric trigger assembly and charging mechanism in accordance with the present invention.
Figure 14:
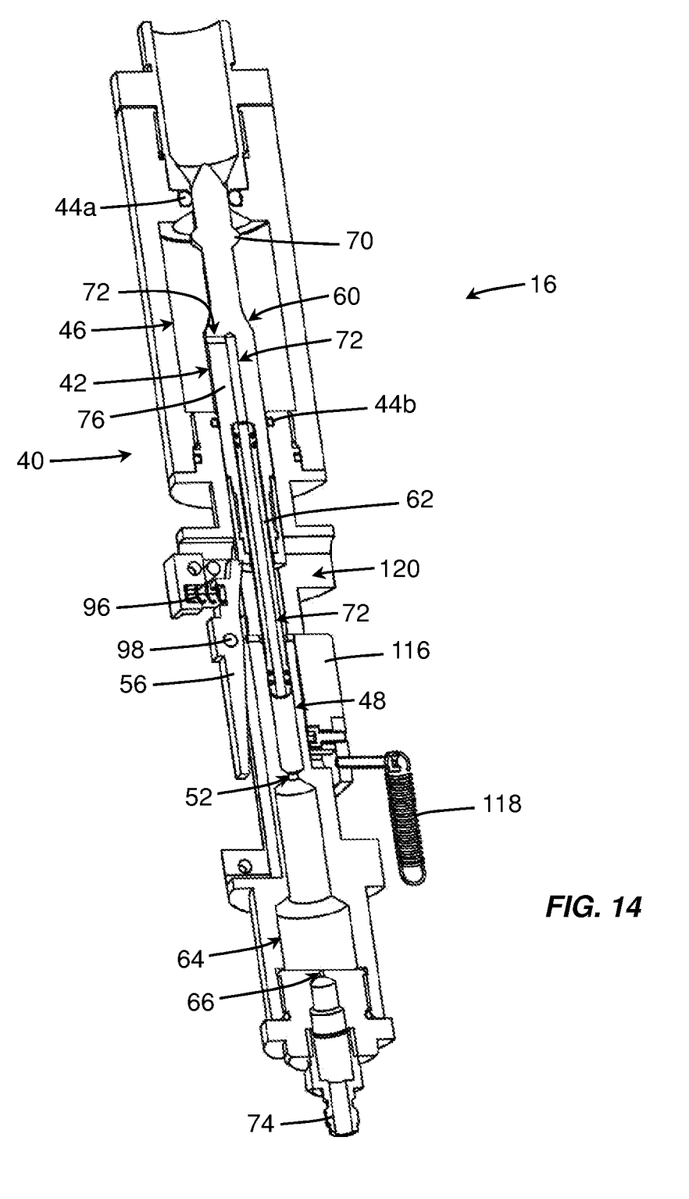
FIG. 14 is a perspective, cross sectional view of the pneumatic engine of FIG. 12 interfacing with a sear of the electric trigger assembly of FIG. 12 and the charging mechanism of FIG. 13.

Referring to FIGS. 9 and 10, a trigger assembly 14 may comprise a collection of parts designed to control the withdrawal and reset of a sear 56. In selected embodiments, a trigger assembly 14 may include a trigger 32, a safety 84, one or more linkages 86, one or more mounting plates 88, one or more spacers 90, an actuator 92, a catch 94, a sear 56, one or more biasing mechanisms 96, one or more pivots 98, one or more stops 100, or the like or a combination or sub-combination thereof.

A trigger 32 may form an interface between a user and the rest of a trigger assembly 14. By manipulating (e.g., pulling) a trigger 32, a user may initiate one or more cycles of an engine 16. A safety 84 may control the operation of a trigger 32. For example, in selected embodiments, a safety 84 may selectively block (and unblock) the motion of a trigger 32 and/or some other component of a trigger assembly 14. Accordingly, when the safety 84 is engaged, a trigger assembly 14 may be blocked from releasing a bolt 42. Conversely, when the safety 84 is disengaged, a trigger assembly 14 may be free to release a bolt 42 when a trigger 32 is properly actuated by a user.

A linkage 86 may communicate motion from one component of a trigger assembly 14 to another component of the trigger assembly 14. For example, in selected embodiments, a linkage 86 may pivotably engage a trigger 32 on one end and pivotably engage an actuator 92 on an opposite end. Accordingly, rotation or pivoting of a trigger 32 may produce rotation or pivoting of an actuator 92.

Mounting plates 88 may form a frame of a trigger assembly 14 and secure various components as they move with respect to one another. In selected embodiments, a trigger assembly 14 may include two mounting plates 88 with various components extending or positioned therebetween. One or more spacers 90 may be positioned between the mounting plates 88. The spacers 90 may be sized so that other components may be free to move (e.g., rotate or pivot) without being clamped to or gripped by the mounting plates 88. In selected embodiments, one or more spacers 90 may provide stable platforms against which one or more biasing mechanisms 96 may act in urging motion of other components of a trigger assembly 14.

An actuator 92 may provide an interface between a linkage 86 and a sear 56. In selected embodiments, rotation or pivoting of an actuator 92 in a certain directions (e.g., a direction corresponding to a pulling of the trigger 32) may rotate or pivot a sear 56 out of engagement with a bolt 42. In this manner, a bolt 42 may be free to act as urged by compressed gas within the forward chamber 46.

In certain embodiments, an actuator 92 may include a catch 94. A catch 94 may form the part of an actuator 92 that abuts or engages a sear 56. A catch 94 may be free to move (e.g., translate) as needed in order to re-engage (e.g., smoothly re-engage) a sear 56 in a reset of the corresponding trigger assembly 14. For example, in selected embodiments, a catch 94 may have a range of motion (e.g., a linear or translation-based range of motion) with respect to the rest of an actuator 92. A biasing mechanism may bias a catch 94 to one end of that range of motion. However, should the catch 94 need to move or deflect to move past a sear 56 (e.g., move back past one end of a sear 56), it may be free to do so. Thereafter, the biasing mechanism may return the catch 94 to a position where it may again engage the sear 56 and maintain the sear 56 in a blocking position with respect to the bolt 42.

A biasing mechanism 96 in accordance with the present invention may have any suitable configuration. For example, a biasing mechanism 96 may comprise elastomeric material, one or more leaf springs, one or more coil springs, or the like or any combination or sub-combination thereof. In addition to a biasing mechanism acting on a catch 94, a trigger assembly 14 may include other biasing mechanisms 96. For example, a biasing mechanism 96 may bias an actuator 92 in a direction opposite a pull of a trigger 32. Another biasing mechanism 96 may bias a sear 56 toward engagement with a bolt 42 and out of engagement with an actuator 92. Both such biasing mechanisms 96 may facilitate a reset of the trigger assembly 14.

A pivot 98 may connect two or more components of a trigger assembly 14 together, while enabling relative motion (e.g., rotation or pivoting) between those components. A stop 100 may define (e.g., limit) a range of motion of one or more components of a trigger assembly 14. In selected embodiments, certain components of a trigger assembly 14 may function as both a pivot 98 and a stop 100. For example, in certain embodiments, a pin may extend through an elongated aperture in a sear 56. Such a pin may function both as a pivot 98 and a stop 100. In this manner, a sear 56 may be able to pivot, translate, or some combination thereof with respect to the rest of the trigger assembly 14.

Referring to FIGS. 11-14, as set forth hereinabove, a trigger assembly 14 may be a strictly mechanical system. Alternatively, a trigger assembly 14 may comprise significant electrical components. Accordingly, a trigger assembly 14 may be described as an electrical trigger assembly. In selected embodiments, an electrical trigger assembly may include a trigger 32, a safety 84, a detector 102, a circuit board 104, a capacitor 106, a solenoid 108, a sear 56, one or more batteries 110, one or more biasing mechanisms 96, one or more pivots 98, one or more stops 100, or the like or one or more combinations or sub-combinations thereof.

A detector 102 may detect motion of a trigger 32. Accordingly, when a trigger 32 has been sufficiently manipulated (e.g., pulled a sufficient distance), a detector 102 may output a particular signal or otherwise communicate to one or more components of a circuit board 104 that a particular condition has been met. A circuit board 104 may include whatever electrical components are necessary to properly support a detector 102 and to interpret or receive any outputs or signals corresponding to the detector 102. A circuit board 104 may also include whatever electrical components are necessary to control operation of a solenoid 108 or the like. In selected embodiments, a circuit board 104 may include a processor performing logic. In other embodiments, any desired logic may be built into a circuit board 104 itself.

A capacitor 106 may store electrical power provided by one or more batteries 110 and deliver it as needed or desired. A capacitor 106 may be able to deliver a large quantity of electrical power in a short period of time. This may be necessary for the proper operation of the corresponding trigger assembly 14. For example, a capacitor 106 may store electrical energy necessary to activate a solenoid 108.

A solenoid 108 may use electrical current to produce a mechanical movement. Accordingly, in selected embodiments, a solenoid 108 may be positioned to actuate a sear 56. The solenoid 108 may do so once to produce one cycle of an engine 16. Alternatively, the solenoid 108 may hold the sear 56 out of engagement with a bolt 42 for as many cycles as desired (e.g., for a set number of cycles, for as long as the trigger 32 is being pulled, or the like).

In selected embodiments, a device 10 may include a charging mechanism 112. A charging mechanism 112 may enable a user to affirmatively return a bolt 42 to a forward position and enable a trigger assembly 14 to reset. In certain embodiments, a charging mechanism 112 may include one or more charging handles 114, a driver 116, one or more biasing mechanisms 118, or the like or a combination or sub-combination thereof.

A charging handle 114 may extend out through a housing (e.g., frame 12) of a device 10 so that it is accessible to a user. Accordingly, by manipulating the charging handle 114, a user may return a bolt 42 to a forward position, enable a trigger assembly 14 to reset, or the like. In selected embodiments, a charging mechanism 112 may include two charging handles 114, one extending out each side of the housing. This may enable a user to operate or cycle a charging mechanism 112 from either side or with either hand.

A driver 116 may extend from a handle to engage a bolt 42. For example, a driver 116 may extend into an aperture 120 in a body 40 to engage a bolt 42. Accordingly, as a charging handle 114 is driven forward, a driver 116 may drive a bolt 42 forward (e.g., to a point where a sear 56 engages the bolt 42).

A charging handle 114 and driver 116 may move through a particular range of motion. In selected embodiments, a biasing mechanism 118 may bias the charging handle 114 and driver 116 toward one end of that range of motion. For example, a biasing mechanism 118 may biasing a driver 116 in a direction away from engagement with a bolt 42. Accordingly, a biasing mechanism 118 may ensure that the driver 116 does not inadvertently interfere with the operation or movement of a bolt 42.

In selected embodiments, a device 10 may include a selector switch 122. A selector switch 122 may enable a user to control the number of cycles of an engine 16 that will occur with each manipulation (e.g., pull) of a trigger 32. For example, by manipulating a selector switch 122, a user may select and switch between semi-automatic operation, fully-automatic operation, multi-cycle burst, or the like or a combination or sub-combination thereof. The nature of a selector switch 122 may depend on the nature of a corresponding trigger assembly 14. For example, a selector switch 122 for a mechanical trigger assembly may be mechanical in nature. Similarly, a selector switch 122 for an electrical trigger assembly may be electrical in nature. In the illustrated embodiments, the selector switch 122 is electrical and connects into or forms part of a circuit board 104.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A pneumatic engine comprising:
   a body comprising a first chamber having an exit aperture, a second chamber having an entrance aperture, and a bolt aperture connecting the first chamber to the second chamber;
   a source delivering compressed gas to the entrance aperture;
   a bolt positioned within the bolt aperture and extending into the first chamber and into the second chamber;
   the bolt comprising a conduit extending therewithin, the conduit placing the first chamber in fluid communication with the second chamber; and
   the bolt selecting traveling within the body through a range of motion, the range of motion comprising a first position wherein the bolt blocks the exit aperture and a second position wherein the bolt does not block the exit aperture.

2. The engine of claim 1, further comprising a whistle sounded by gas exiting the body via the exit aperture.

3. The engine of claim 2, further comprising a trigger assembly selectively engaging the bolt to maintain the bolt in the first position.

4. The engine of claim 3, wherein the bolt comprises a step down in diameter, the step down being located within the first chamber.

5. The engine of claim 4, wherein the step down enables compressed gas in the first chamber to bias the bolt in a first direction away from the first position and toward the second position.

6. The engine of claim 5, wherein compressed gas in the second chamber biases the bolt in a second direction, opposite the first direction, away from the second position and toward the first position.

7. The engine of claim 1, further comprising a trigger assembly selectively engaging the bolt to maintain the bolt in the first position.

8. The engine of claim 1, wherein the bolt comprises a step down in diameter, the step down being located within the first chamber.

9. The engine of claim 8, wherein the step down enables compressed gas in the first chamber to bias the bolt in a first direction away from the first position and toward the second position.

10. The engine of claim 9, wherein compressed gas in the second chamber biases the bolt in a second direction, opposite the first direction, away from the second position and toward the first position.

11. A method of metering a flow of compressed gas, the method comprising:
  obtaining a pneumatic engine comprising
    a body comprising a first chamber having an exit aperture, a second chamber having an entrance aperture, and a bolt aperture connecting the first chamber to the second chamber,
    a source delivering compressed gas to the entrance aperture, and
    a bolt positioned within the bolt aperture and extending into the first chamber and into the second chamber, the bolt comprising a conduit placing the first chamber in fluid communication with the second chamber; and
  cycling the pneumatic engine, the cycling comprising
    releasing the bolt to move as biased,
    driving, by a first quantity of compressed gas contained within the first chamber, the bolt in a first direction to unblock the exit aperture,
    venting of the first quantity of compressed gas out of the first chamber via the exit aperture,
    compressing, by the bolt as it moves in the first direction, gas in the second chamber to generate a second quantity of compressed gas, and
    driving, by the second quantity of compressed gas, the bolt in a second direction, opposite the first direction, to block the exit aperture.

12. The method of claim 11, wherein the pneumatic engine further comprises a whistle.

13. The method of claim 12, wherein cycling further comprises sounding, by the first quantity of compressed gas, the whistle after the first quantity of compressed gas exits the first chamber via the exit aperture.

14. The method of claim 13, wherein the pneumatic engine further comprises a trigger assembly selectively engaging the bolt.

15. The method of claim 14, wherein the releasing comprises actuating the trigger assembly.

16. The method of claim 15, wherein the bolt further comprises a step down in diameter, the step down being located within the first chamber.

17. The method of claim 16, wherein the driving the bolt in the first direction in a result of a pressure differential produced by the step down.

18. The method of claim 17, wherein the cycling further comprises recharging the first chamber, the recharging comprising passing the second quantity of compressed gas through the conduit from the second chamber to the first chamber.

19. The method of claim 11, wherein:
  the bolt further comprises a step down in diameter, the step down being located within the first chamber; and
  the driving the bolt in the first direction in a result of a pressure differential produced by the step down.

20. The method of claim 11, wherein the cycling further comprises recharging the first chamber, the recharging comprising passing the second quantity of compressed gas through the conduit from the second chamber to the first chamber.

* * * * *